United States Patent
Iio et al.

(10) Patent No.: US 8,238,840 B2
(45) Date of Patent: Aug. 7, 2012

(54) COMMUNICATION APPARATUS

(75) Inventors: Taro Iio, Yokohama (JP); Satoko Omura, Yokohama (JP)

(73) Assignee: Kyocera Corporation, Kyoto (JP)

( * ) Notice: Subject to any disclaimer, the term of this patent is extended or adjusted under 35 U.S.C. 154(b) by 366 days.

(21) Appl. No.: 12/438,516

(22) PCT Filed: Aug. 24, 2007

(86) PCT No.: PCT/JP2007/066487
§ 371 (c)(1),
(2), (4) Date: Jun. 7, 2010

(87) PCT Pub. No.: WO2008/023803
PCT Pub. Date: Feb. 28, 2008

(65) Prior Publication Data
US 2010/0248645 A1  Sep. 30, 2010

(30) Foreign Application Priority Data

Aug. 25, 2006 (JP) .................. 2006-229583
Oct. 4, 2006 (JP) .................. 2006-273388

(51) Int. Cl.
*H04B 1/40* (2006.01)
(52) U.S. Cl. .................. 455/76; 455/73; 455/196.1
(58) Field of Classification Search .................. 455/73, 455/76, 82, 88, 196.1, 255, 260, 550.1
See application file for complete search history.

(56) References Cited

U.S. PATENT DOCUMENTS 7,062,229 B2 * 6/2006 Dunworth et al. .............. 455/76
7,148,764 B2 * 12/2006 Kasahara et al. .............. 331/179

FOREIGN PATENT DOCUMENTS

| JP | 2000-156631 | 6/2000 |
| JP | 2003-280792 | 10/2003 |
| JP | 2004-179861 | 6/2004 |
| JP | 2004-311196 | 11/2004 |
| JP | 2005-522797 | 7/2005 |

* cited by examiner

*Primary Examiner* — Tuan H Nguyen
(74) *Attorney, Agent, or Firm* — DLA Piper LLP (US)

(57) ABSTRACT

A communication apparatus includes: a communication unit COM that performs operation control of a function involving transmission or reception of an electromagnetic wave by an antenna; a touch sensor module TSM having an oscillation circuit and an electrode connected to the oscillation circuit; a power supply PS that supplies power to the oscillation circuit; and a power supply controller PSCON that controls supply of power by the power supply PS. The touch sensor module TSM detects a contact operation based on an oscillation state of the oscillation circuit which varies in accordance with a contact operation. As a result, a state where the power supply PS is supplying power to the oscillation circuit under the control of the power supply controller PSCON and a state where the communication unit COM is performing operation control of the function involving transmission or reception of an electromagnetic wave do not exist concurrently.

11 Claims, 10 Drawing Sheets

FIG. 4
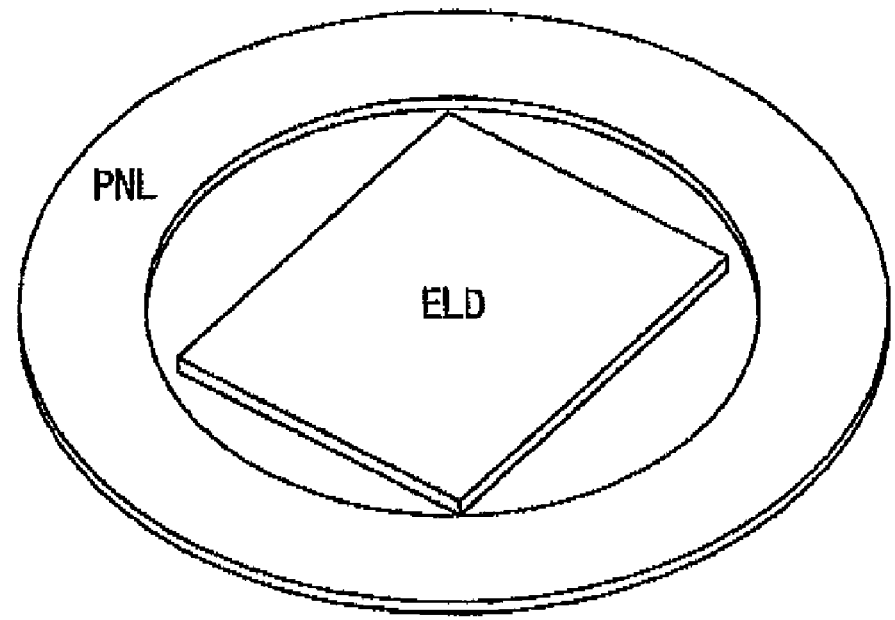
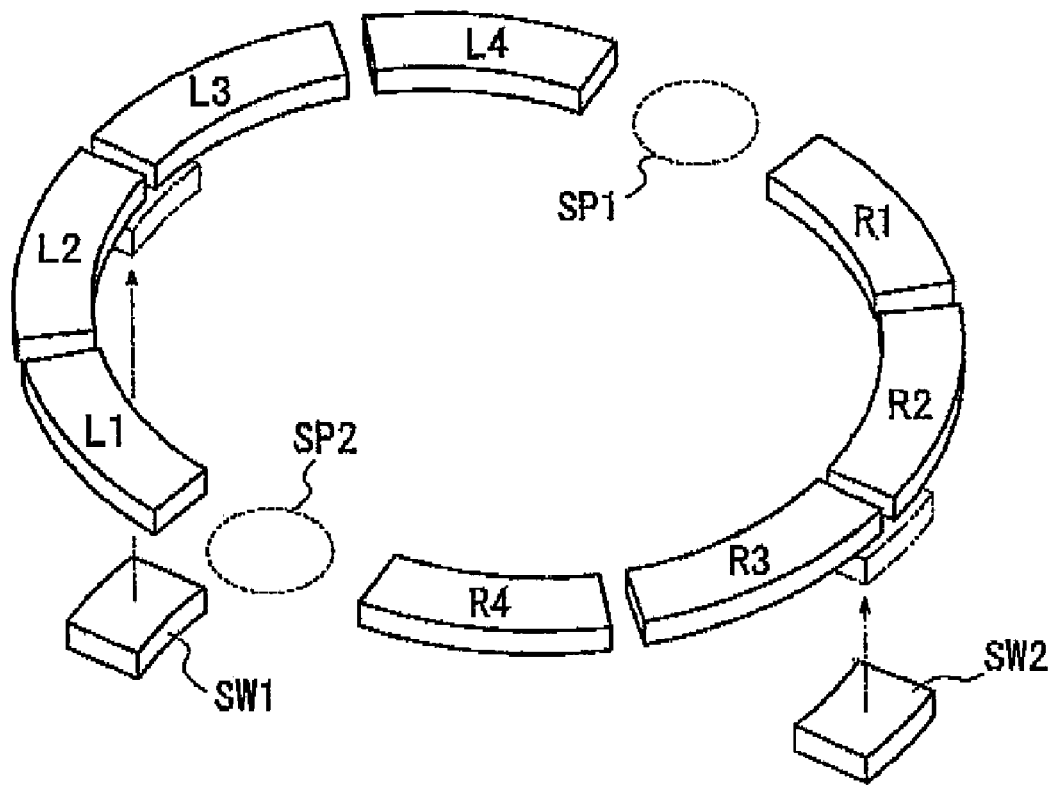

FIG. 6
(a)
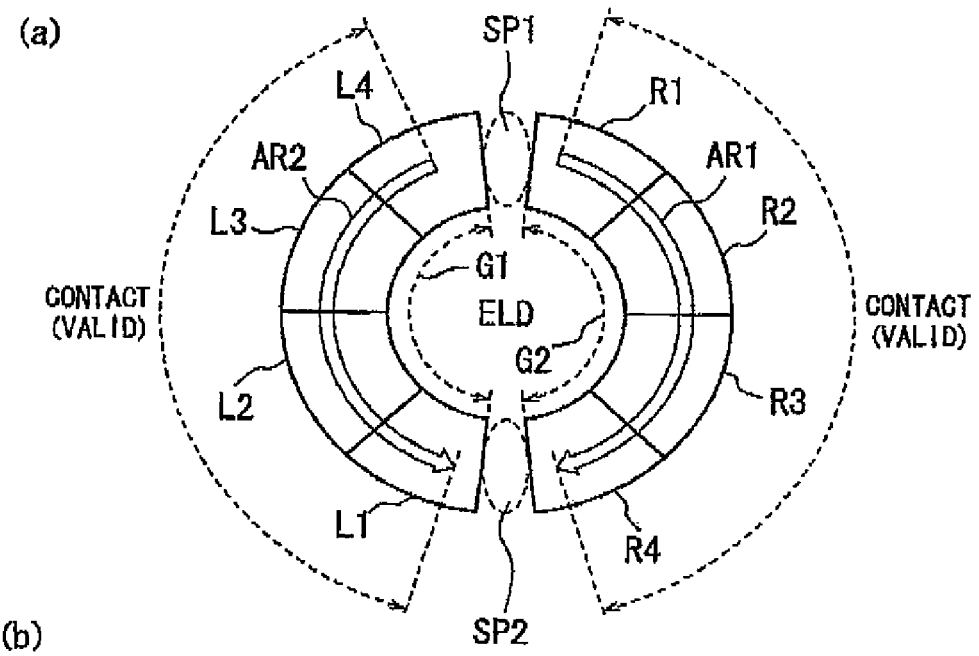
(b)
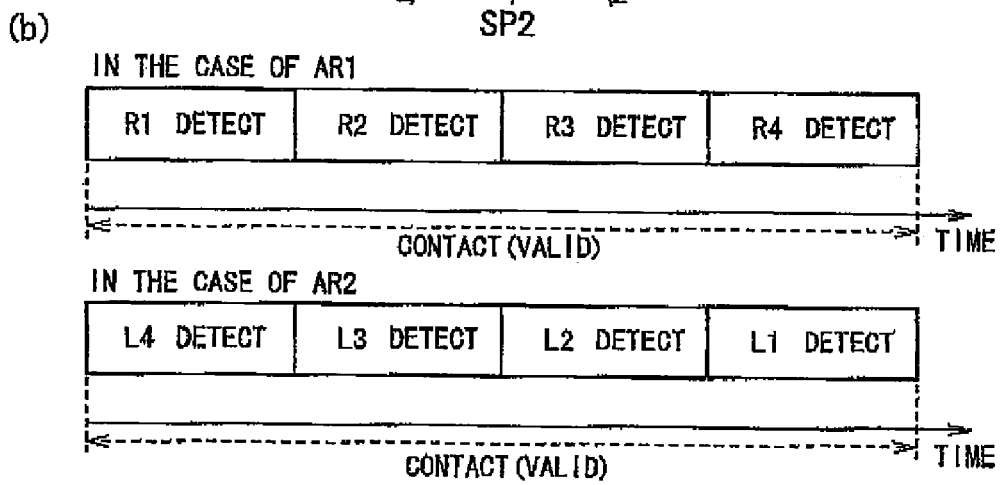
(c)
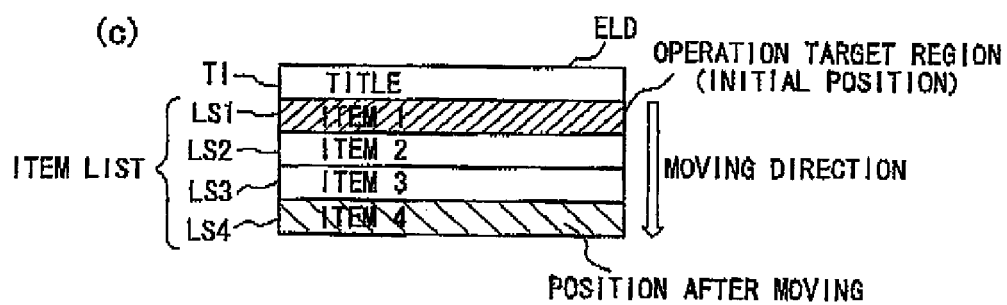

of the oscillation signal outputted by an oscillating unit of an operation detecting unit as noise into a signal transmitted or received by an antenna.

COMMUNICATION APPARATUS

TECHNICAL FIELD

The present invention relates to a communication apparatus, and more particularly, to a communication apparatus provided with an antenna, a signal processing unit that processes signals transmitted or received by the antenna, and an operation detecting unit.

BACKGROUND ART

Conventionally, various interfaces and configurations have been developed as operation detecting units of communication apparatuses. For example, there is a technique in which a communication apparatus is provided with a rotary dial-type input device, wherein a cursor displayed on a display unit is moved in accordance with the amount of rotation of the rotary dial-type input device (refer to Patent Document 1). However, with such a conventional technique, the use of a "rotary dial" that involves physical and mechanical rotation is likely to cause malfunctions, failures and the like due to mechanical attrition and the like, giving rise to problems such as the need for performing maintenance on an operation detecting unit, a short period of endurance, and the like.

In consideration thereof, techniques have been proposed in which a touch sensor is used as an operation detecting unit that does not involve physical and mechanical rotation (refer to Patent Documents 2 and 3). The proposed techniques include sequentially positioning a plurality of touch sensor elements, detecting an operation involving movement based on contact detection by each of the touch sensor elements, and performing selection operation control in which a selection choice is selected from a plurality of selection choices in accordance with the detection results.

In addition, a touch sensor is known which includes an operating unit, an oscillating unit that outputs an oscillation signal, and a detecting unit that detects an oscillation signal outputted from the oscillating unit, wherein an operation on the operating unit is detected based on detection results of the detecting unit which vary in association with the operation (refer to Patent Document 4).

Patent Document 1: Japanese Patent Laid-Open No. 2003-280792
Patent Document 2: Japanese Patent Laid-Open No. 2005-522797
Patent Document 3: Japanese Patent Laid-Open No. 2004-311196
Patent Document 4: Japanese Patent Laid-Open No. 2000-156631

SUMMARY OF INVENTION

Technical Problem

However, when the aforementioned touch sensor is disposed at an operation detecting unit configured so as to include an antenna that transmits or receives a signal and an oscillating unit and the touch sensor is operated, in a case where the frequency of an oscillation signal outputted by the oscillating unit and the frequency of a signal transmitted or received by the antenna are similar in value, there is a problem in that the oscillation signal outputted by the oscillating unit is inadvertently incorporated as noise into the signal transmitted or received by the antenna.

The present invention has been made in consideration of the problem described above, and an object thereof is to provide a communication apparatus that suppresses the incorporation of an oscillation signal outputted by an oscillating unit of an operation detecting unit as noise into a signal transmitted or received by an antenna.

Solution to Problem

In order to achieve the object described above, a communication apparatus according to the present invention is characterized by including: an antenna; a signal processing unit that processes a signal transmitted or received by the antenna; an operation detecting unit having an operating unit, an oscillating unit that outputs an oscillation signal, and a detecting unit that detects an oscillation signal outputted from the oscillating unit, and which detects an operation on the operating unit based on detection results of the detecting unit which vary in association with the operation; and a control unit that controls at least either the signal processing unit or the operation detecting unit when processing of the signal by the signal processing unit and output of the oscillation signal by the oscillating unit of the operation detecting unit are performed concurrently.

The control unit preferably reduces an amplitude of the oscillation signal outputted by the oscillating unit of the operation detecting unit when processing of the signal by the signal processing unit and output of the oscillation signal by the oscillating unit of the operation detecting unit are performed concurrently.

The control unit preferably varies a frequency of the oscillation signal outputted by the oscillating unit of the operation detecting unit when processing of the signal by the signal processing unit and output of the oscillation signal by the oscillating unit of the operation detecting unit are performed concurrently.

The control unit preferably suppresses a supply of power to the oscillating unit of the operation detecting unit when processing of the signal by the signal processing unit and output of the oscillation signal by the oscillating unit of the operation detecting unit are performed concurrently.

The control unit preferably suppresses processing of the signal by the signal processing unit when processing of the signal by the signal processing unit and output of the oscillation signal by the oscillating unit of the operation detecting unit are performed concurrently.

In addition, preferably, the communication apparatus includes: a second operation detecting unit that is not provided with the oscillating unit and which detects an operation; and a function executing unit that executes predetermined functions, wherein when processing of the signal by the signal processing unit and output of the oscillation signal by the oscillating unit of the operation detecting unit are performed concurrently, the control unit performs any of reducing an amplitude of the oscillation signal outputted by the oscillating unit of the operation detecting unit, varying a frequency of the oscillation signal outputted by the oscillating unit of the operation detecting unit, suppressing a supply of power to the oscillating unit of the operation detecting unit, and combinatorial control thereof, and at the same time controls execution of the predetermined functions by the function executing unit based on an operation detected by the second operation detecting unit, while when processing of the signal by the signal processing unit and output of the oscillation signal by the oscillating unit of the operation detecting unit are not performed concurrently, the control unit controls execution of the predetermined functions by the function executing unit based on the operation detected by the operation detecting unit.

Furthermore, preferably, the communication apparatus includes an annunciating unit that performs a predetermined annunciation based on the signal processed by the signal processing unit, whereby when processing of the signal by the signal processing unit and output of the oscillation signal by the oscillating unit of the operation detecting unit are performed concurrently, the control unit suppresses processing by the signal processing unit of a signal associated with an annunciation by the annunciating unit which is a signal transmitted or received by the antenna.

When processing of the signal by the signal processing unit and output of the oscillation signal by the oscillating unit of the operation detecting unit are performed concurrently, the control unit preferably suppresses processing by the signal processing unit of a signal associated with an audio-based annunciation by the annunciating unit which is a signal transmitted or received by the antenna.

When processing of the signal by the signal processing unit and output of the oscillation signal by the oscillating unit of the operation detecting unit are performed concurrently, the control unit preferably suppresses processing by the signal processing unit of a signal associated with an image-based annunciation by the annunciating unit which is a signal transmitted or received by the antenna.

Moreover, a communication apparatus according to the present invention is characterized by including: an antenna; a signal processing unit that processes a signal transmitted or received by the antenna; an annunciating unit that performs a predetermined annunciation based on the signal processed by the signal processing unit; an operation detecting unit having an operating unit, an oscillating unit that outputs an oscillation signal, and a detecting unit that detects an oscillation signal outputted from the oscillating unit, and which detects an operation on the operating unit based on variations in the oscillation signal of the oscillating unit detected by the detecting unit and which are associated with the operation; and a control unit that suppresses the annunciation by the annunciating unit when processing of the signal by the signal processing unit and output of the oscillation signal by the oscillating unit of the operation detecting unit are performed concurrently.

In addition, a communication apparatus according to the present invention is characterized by including: an antenna; a transmission/reception level detecting unit that detects a transmission/reception level of a signal transmitted or received by the antenna; a signal processing unit that processes a signal transmitted or received by the antenna; an operation detecting unit having an operating unit, an oscillating unit that outputs an oscillation signal, and a detecting unit that detects an oscillation signal outputted from the oscillating unit, and which detects an operation on the operating unit based on variations in the oscillation signal of the oscillating unit detected by the detecting unit and which are associated with the operation; and a control unit which, when processing of the signal by the signal processing unit and output of the oscillation signal by the oscillating unit of the operation detecting unit are performed concurrently and the transmission/reception level of the signal detected by the transmission/reception level detecting unit is equal to or greater than a predetermined level, performs any of reducing an amplitude of the oscillation signal outputted by the oscillating unit of the operation detecting unit; varying a frequency of the oscillation signal outputted by the oscillating unit of the operation detecting unit, suppressing a supply of power to the oscillating unit of the operation detecting unit, and combinatorial control thereof, while when processing of the signal by the signal processing unit and output of the oscillation signal by the oscillating unit of the operation detecting unit are performed concurrently and the transmission/reception level of the signal detected by the transmission/reception level detecting unit is lower than the predetermined level, suppresses the control of an oscillation output of the oscillating unit.

Advantageous Effects on Invention

With a communication apparatus according to the present invention, since a control unit controls at least either a signal processing unit or an operation detecting unit when processing by the signal processing unit of a signal transmitted or received by an antenna and output of an oscillation signal by an oscillating unit of the operation detecting unit are performed concurrently, it is now possible to suppress the incorporation of an oscillation signal outputted by the oscillating unit of the operation detecting unit as noise into a signal transmitted or received by the antenna.

BRIEF DESCRIPTION OF DRAWINGS

FIG. 4 is an exploded perspective view of the components of the cellular phone terminal shown in FIG. 3;

FIG. 6 is a diagram illustrating a response by a sub display unit in the event that a user traces over sensor elements;

DESCRIPTION OF EMBODIMENTS

Figure 1:
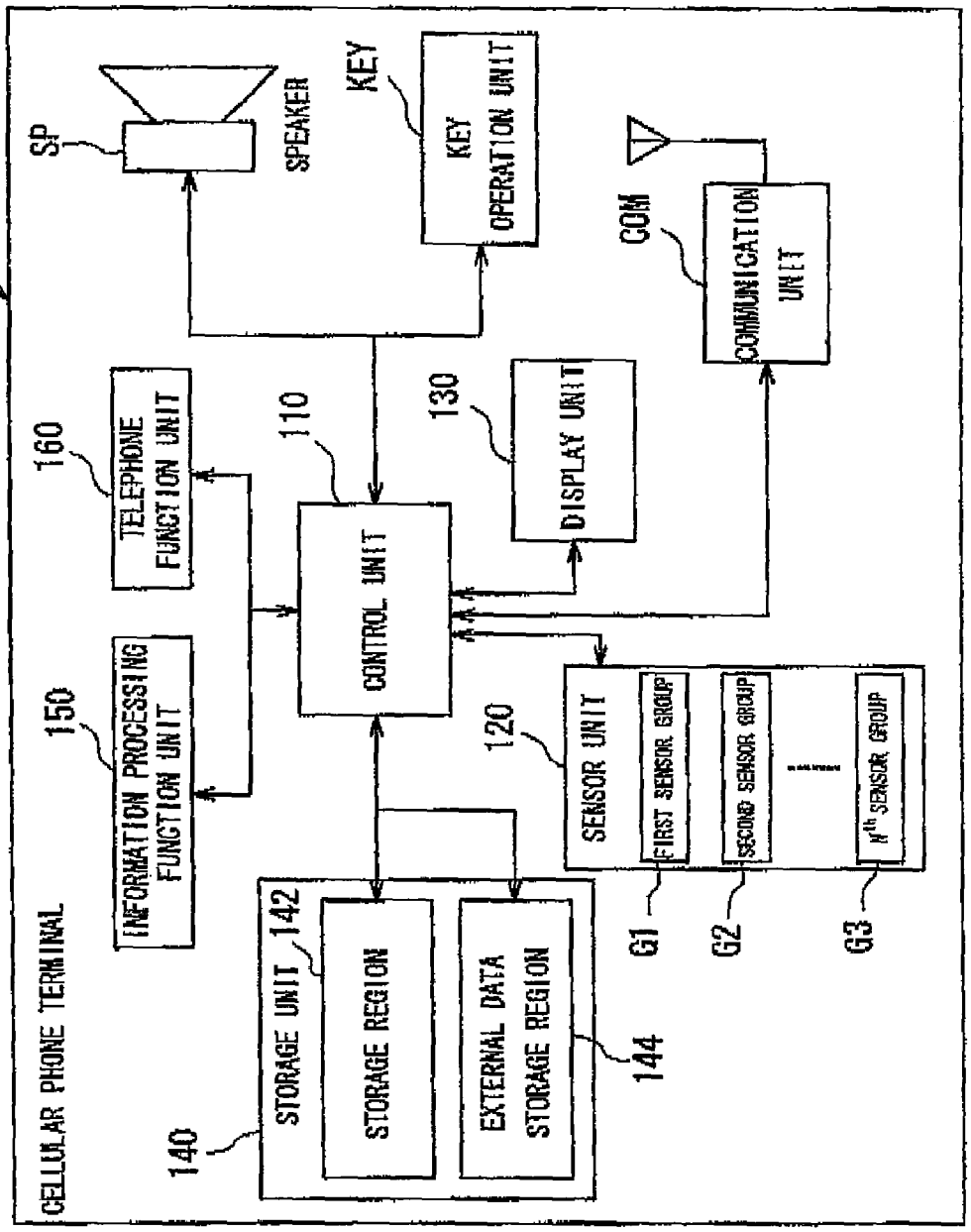
FIG. 1 is a block diagram showing a basic configuration of a cellular phone terminal to which the present invention has been applied.

Embodiments of the present invention will now be described with reference to the drawings. Hereinafter, a cellular phone terminal, to which the present invention is to be applied, will be described as a typical example of a communication apparatus. FIG. 1 is a block diagram showing a basic configuration of a cellular phone terminal to which the present invention has been applied. A cellular phone terminal 100 shown in FIG. 1 includes: a control unit 110; a sensor unit 120 (an operation detecting unit); a display unit 130 (an annunciating unit); a storage unit (a flash memory or the like) 140; an information processing function unit 150; a telephone function unit 160; a key operating unit KEY and a speaker SP (an annunciating unit); and a communication unit COM (a signal processing unit) that connects to a communications network, not shown, and which processes a signal transmitted or received by an antenna such as a telephone message or a text message. In addition, the sensor unit 120 includes, depending on the intended use, N-number of sensor element groups made up of a plurality of sensor elements (operating units) (for example, sensor electrodes whose detecting units are provided on an outer surface of an apparatus case and which detect an object such as a finger coming into contact or coming into proximity) or, in other words, a first sensor element group G1, a second sensor element group G2, and an nth sensor element group G3. The storage unit 140 includes a storage region 142 and an external data storage region 144. The control unit 110 and the information processing function unit 150 are preferably made up of computing means such as a CPU, a software module, and the like. Moreover, a serial interface unit SI to be described later, an RFID module RFID and an infrared-ray communication unit IR connected to the control unit 110 via the serial interface unit SI, a camera 220, a light 230, a microphone MIC, a radio module RM connected to a radio antenna (antenna) capable of receiving an electromagnetic wave containing a broadcast signal of a radio broadcast and which performs an annunciation operation based on the broadcast signal, a power supply PS, a power supply controller PSCON that controls the supply of power by the power supply PS, and the like are connected to the control unit 110. However, for simplicity, descriptions thereof shall be omitted here.

Functions of the respective blocks shown in the block diagram of FIG. 1 shall be briefly described. The control unit 110 uses the sensor unit 120 to detect an operation by a user, stores detected information in the storage region 142 of the storage unit 140, and controls processing of stored information using the information processing function unit 150. Subsequently, the control unit 110 causes the display unit 130 to display information corresponding to processing results. Furthermore, the control unit 110 controls the telephone function unit 160 that provides an ordinary call function, the key operating unit KEY, and the speaker SP. The display unit 130 is configured so as to include a sub display unit ELD and a main display unit (a display unit provided at a position that is hidden in a closed state and exposed in an opened state of the cellular phone terminal 100), not shown. Moreover, operation control of predetermined functions such as a music player is arranged to be performed depending on states of operations on the sensor unit 120 and a tact switch (a second operation detecting unit), to be described later.

Figure 2:
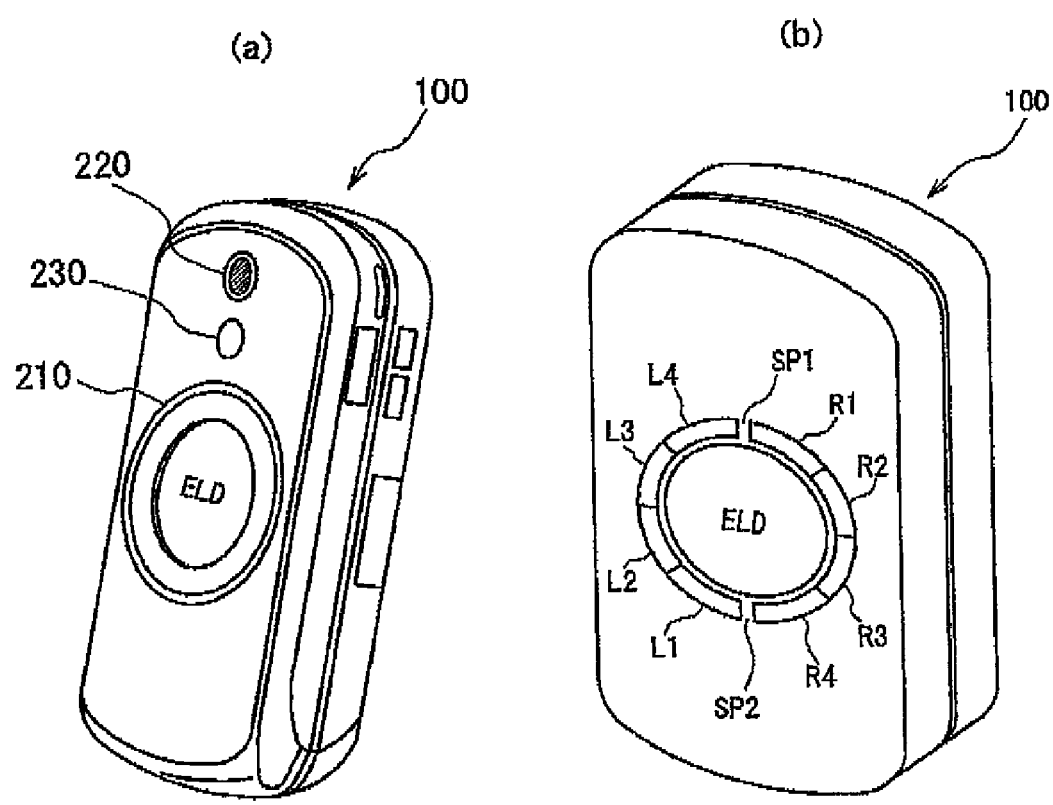
FIG. 2 is a perspective view of a cellular phone terminal with sensor elements mounted to a case thereof.

FIG. 2 is a perspective view of a cellular phone terminal with sensor elements mounted to a case thereof. In addition to the closed state shown in FIG. 2, the cellular phone terminal 100 is capable of forming an opened state by rotationally moving and sliding a hinge portion. The touch sensor unit 210 is provided at a position operable even in the closed state. FIG. 2(a) is a perspective view showing an external appearance of the cellular phone terminal 100. The cellular phone terminal 100 includes: a touch sensor unit 210 (as far as the external appearance is concerned, the sensor unit 120 or, in other words, a panel PNL covering the sensor element groups G1 and G2, is shown (to be described later with reference to FIG. 3)); a camera 220; and a light 230. FIG. 2(b) is a perspective view of the cellular phone terminal 100 in which the panel PNL has been omitted and only a layout of the periphery of the sensor elements and the sub display unit ELD is shown for the purpose of illustrating operations of the touch sensor. As shown, sensor elements L1 to L4 and R1 to R4 are arranged along the periphery of the sub display unit ELD. The sensor elements L1 to L4 constitute the first sensor element group G1 while the sensor elements R1 to R4 constitute the second sensor element group G2. The first sensor element group G1 and the second sensor element group G2 are divided separated by separators SP1 and SP2. Relative to the layout of the first sensor element group G1, the second sensor element group G2 has a line-symmetric layout with respect to the sub display unit ELD and with the direction in which selection candidate items are arranged as a center line. In addition, while an organic EL display is used as the sub display unit ELD in the present configuration, for example, a liquid crystal display or the like may be used instead. Furthermore, in the present configuration, it is assumed that an electrostatic capacitance-type touch sensor is used as the sensor unit 120.

In the same manner as a conventionally known operation detecting unit, the sensor unit 120 is configured so as to include an oscillating unit and a detecting unit that detects an oscillation signal outputted by the oscillating unit. The oscillating unit is configured so as to be connected to the sensor elements via a capacitor and to the detecting unit. In addition, the oscillating unit outputs an oscillation signal with a predetermined frequency and amplitude when power is being supplied from the power supply PS, whereby the detecting unit detects the outputted oscillation signal. Subsequently, when the sensor elements are brought into contact and an operation is performed, a variation occurs in the oscillation condition of the oscillation unit and the detecting unit detects the varied oscillation signal. The sensor unit 120 detects the operation based on the detection result detected by the detecting unit or, in other words, the variation of the detected oscillation signal.

In the cellular phone terminal 100 shown in FIG. 2, the sub display unit ELD displays information corresponding to the intended use of the cellular phone terminal 100. For example, when the cellular phone terminal 100 is used as a music player, titles of playable songs are displayed on the sub display unit ELD. A combination of a song title and an artist name form an item or, in other words, a "selection candidate item". The user operates the touch sensor unit 210 as an operation input unit to vary the electrostatic capacitances of the sensor elements L1 to L4 and R1 to R4, and selects a song title by moving items displayed on the sub display unit ELD or by moving operational object regions. In this case, by configuring the touch sensor such that sensor elements are arranged around the sub display unit ELD as shown in FIG. 2, it is now possible to prevent a mounting portion from occupying a large space on an external case of a small communication apparatus and, at the same time, the user is able to operate the sensor elements while viewing the display on the sub display unit ELD.

Figure 3:
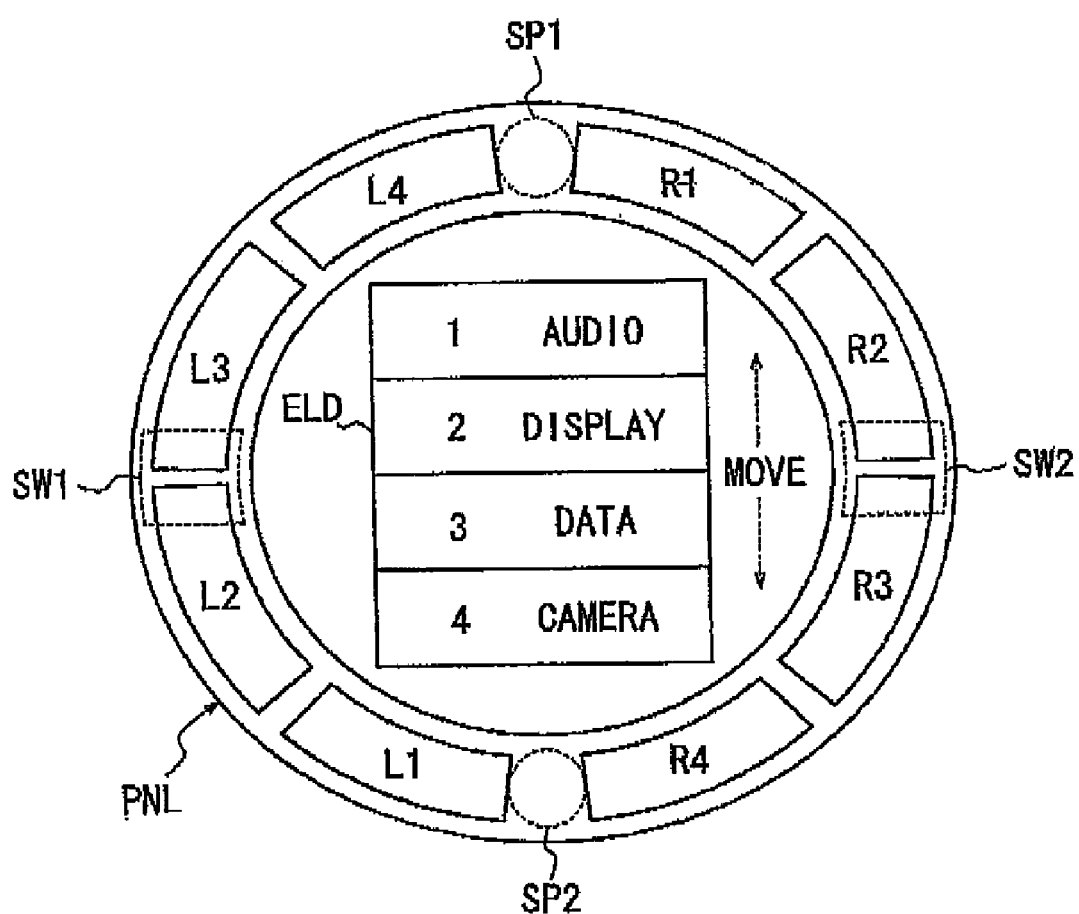
FIG. 3 is a plan view showing a layout of components of a cellular phone terminal according to the present invention.

FIG. 3 is a plan view showing a layout of components of the cellular phone terminal 100 and, in particular, those of the touch sensor unit 210 according to the present invention. For convenience of depiction and description, only a part of the components will be shown and described. As shown, a toric dielectric panel PNL is positioned along the periphery of the sub display unit ELD made up of organic EL elements. The panel PNL is preferably made sufficiently thin so as to avoid affecting the sensitivity of the sensor elements to be provided thereunder. Arranged approximately circularly and serially underneath the panel PNL are eight electrostatic capacitance-type sensor elements L1 to L4 and R1 to R4 capable of detecting a human finger coming into contact or coming into proximity. The four sensor elements L1 to L4 on the left side constitute the first sensor element group G1 while the four sensor elements R1 to R4 on the right side constitute the second sensor element group G2. Clearances (gaps) are provided between adjacent sensor elements in each sensor element group in order to prevent adjacent sensor elements from interfering with the contact detecting functions of each other. However, these clearances become unnecessary when using non-interfering sensor elements. The separator SP1 that is a larger clearance than the clearances described above (for example, twice as long or greater) is provided between the sensor element L4 positioned at one end of the first sensor element group G1 and the sensor element R1 positioned at one end of the second sensor element group G2. In a manner similar to the separator SP1, the separator SP2 is provided between the sensor element L1 positioned at the other end of the first sensor element group G1 and the sensor element R4 positioned at the other end of the second sensor element group G2. Due to the separators SP1 and SP2 as described above, mutual interference can be suppressed when the first sensor element group G1 and the second sensor element group G2 are operated separately.

The respective sensor elements of the first sensor element group G1 are arranged in an arc-like pattern. The center of a tact switch SW1 (an operating unit) that detects an operational state is positioned underneath the center of the arc or, in other words, midway between the sensor elements L2 and L3. In a similar manner, the center of a tact switch SW2 (an operating unit) that detects an operational state is positioned underneath the center of the arc formed by the respective sensor elements of the second sensor element group G2 or, in other words, midway between the sensor elements R2 and R3. As shown, by positioning tact switches approximately in the center in the arrangement direction of the sensor element groups which are positions not associated with directionality, the user can easily recognize that the tact switches are switches for performing operations not directly related to direction indication due to operations performed by the user on a sensor element which are accompanied by directional movements of a finger. In other words, since a tact switch positioned at an end (for example, L1 or L4) instead of the center in the arrangement direction of a sensor element group is suggestive of endward directionality, there is a risk that the user may misinterpret the tact switch as a "switch" to be long-pressed for continuing a movement operation by the touch sensor or the like. On the other hand, as is the case with the configuration according to the present invention, positioning a tact switch at the center in the arrangement direction of a sensor element group reduces the risk of such misinterpretations, thereby providing a more comfortable user interface. In addition, since the tact switches are disposed underneath the sensor elements and are therefore not exposed to the exterior surface of the apparatus, the number of operating units exposed in regards to the exterior appearance of the apparatus can be reduced, thereby presenting a sleek impression that does not require complex operations. Meanwhile, when a switch is provided at a position other than underneath the panel PNL, a penetrating hole must be provided separately on the apparatus case. Depending on the position at which such a penetrating hole is provided, a decline in case strength may occur. In the present configuration, disposing the tact switches underneath the panel PNL and the sensor elements eliminates the need for newly providing penetrating holes, thereby suppressing a decline in case strength. Moreover, it is needless to say that the tact switches are not provided with oscillating units.

For example, when the user traces the sensor elements L1, L2, L3 and L4, in this order, with a finger in an upward arc pattern, an item that is displayed as a selection target region (displayed inverted, highlighted in another color, or the like) among the selection candidate items (in this case, sound, display, data, and camera) displayed on the sub display unit ELD sequentially changes to the item positioned upward, or the selection candidate items are scrolled up. When a desired selection candidate item is displayed as the selection target region, the user can finalize a selection by pressing down on the tact switch SW1 through the panel PNL and the sensor elements L2 and L3 or change the display itself to another screen by pressing down on the tact switch SW2. In other words, the panel PNL has sufficient flexibility for pressing down on the tact switches SW1 and SW2, or is mounted to the apparatus case to be slightly tiltable to also function as a plunger for the tact switches SW1 and SW2.

FIG. 4 is an exploded perspective view of the components, and in particular, the touch sensor unit 210, of the cellular phone terminal shown in FIGS. 2 and 3. As shown in the drawing, the panel PNL and the display unit ELD are disposed on a first layer that forms an outer surface of the terminal case. The sensor elements L1 to L4 and R1 to R4 are disposed on a second layer situated underneath the panel PNL on the first layer. The tact switches SW1 and SW2 are respectively disposed on a third layer situated underneath the space between the sensor elements L2 and L3 and the space between the sensor elements R2 and R3 of the second layer.

Figure 5:
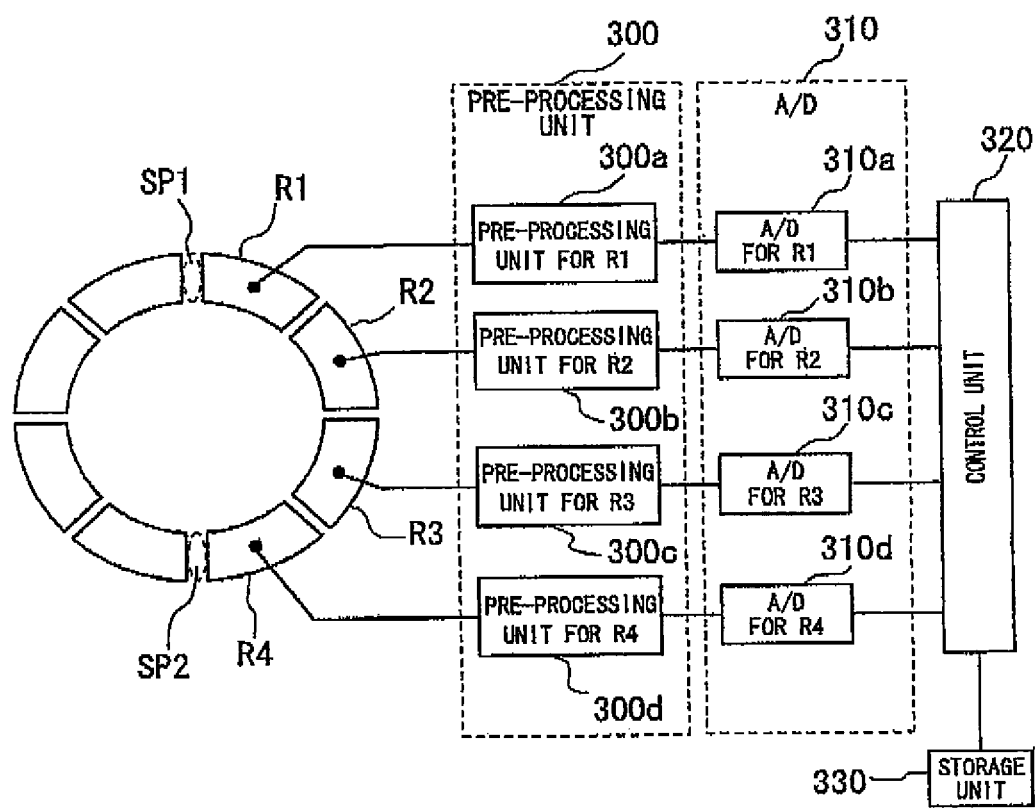
FIG. 5 is a schematic block diagram illustrating processing of contact detection data from each sensor element of a cellular phone terminal according to the present invention.

FIG. 5 is a schematic block diagram illustrating processing of contact detection data from each of the sensor elements in a cellular phone terminal according to the present invention. While only the sensor elements R1 to R4 are shown for simplicity of description, it should be understood that the sensor elements L1 to L4 are similarly configured. A high frequency wave is applied to each of the sensor elements R1 to R4. A high frequency state calibrated and recognized in consideration of a certain amount of variation in stray capacitance is set as the reference. In the event that a variation in the high frequency state based on a variation in the electrostatic capacitance when brought into contact with a finger or the like is detected in a pre-processing unit 300 (an R1 pre-processing unit 300*a*, an R2 pre-processing unit 300*b*, an R3 pre-processing unit 300*c*, and a R4 pre-processing unit 300*d*), the variation is transmitted to an A/D converter 310 (an R1 A/D converter 310*a*, an R2 AD converter 310*b*, an R3 A/D converter 310*c*, and an R4 A/D converter 310*d*) and is converted into a digital signal indicating contact detection. The digitized signal is transmitted to a control unit 320 and, as a set of collected signals of the sensor element group, is stored in a storage unit 330 as information retained by the signals. Subsequently, the signal is transmitted to the serial interface unit and an interrupt handler, and after being converted by the interrupt handler into a signal readable by the touch sensor driver, the converted signal is input into a queue. Moreover, the control unit 320 detects the direction at the point where contact is detected in two or more adjacent sensor elements based on the information stored in the storage unit 330.

Figure 7:
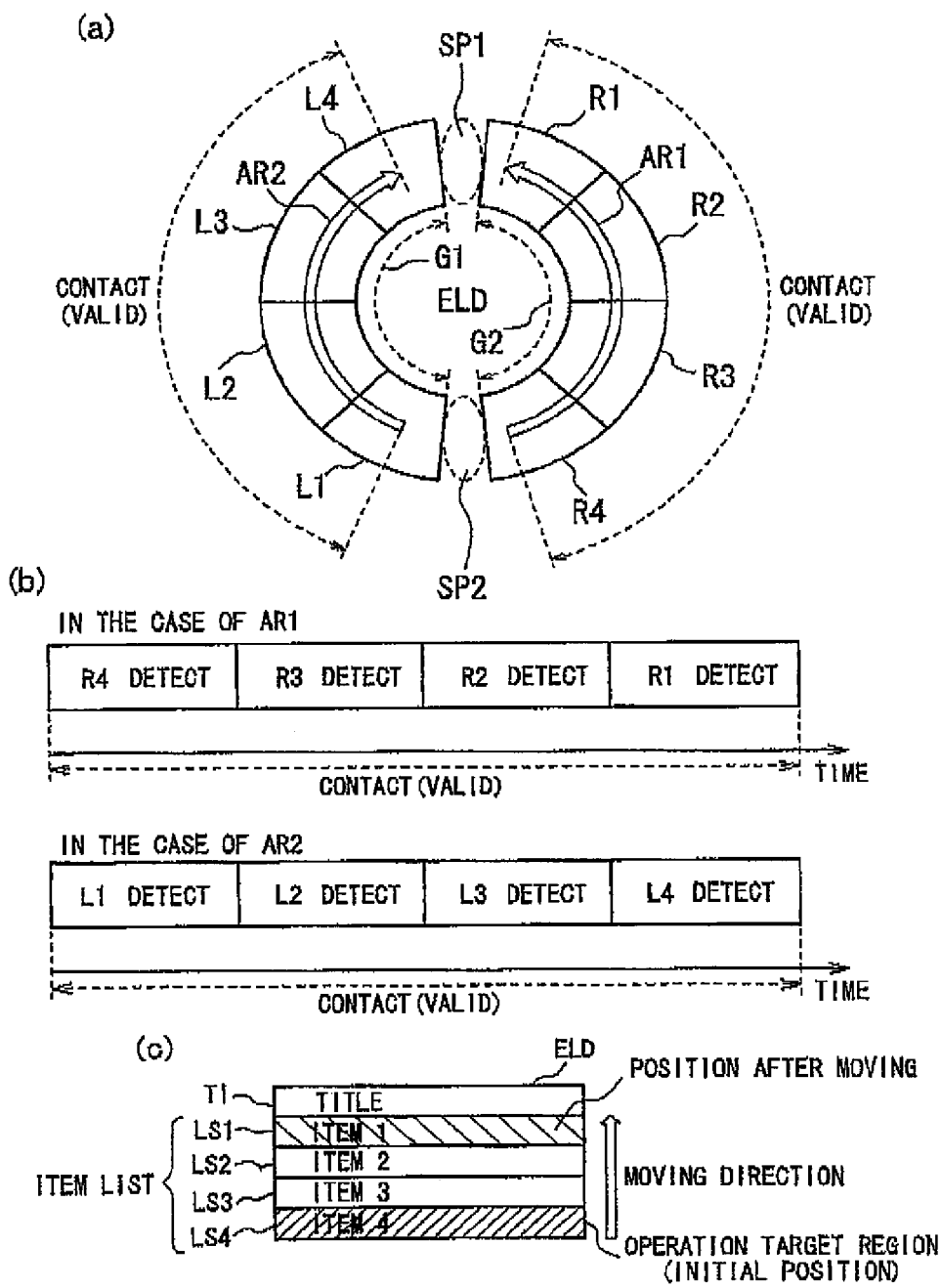
FIG. 7 is a diagram illustrating a response by a sub display unit in the event that a user traces over sensor elements.

FIGS. 6 and 7 are diagrams illustrating a response by the sub display unit in the case where the user traces over sensor elements. In FIGS. 6 and 7: (a) is a schematic view showing only the sub display unit ELD mounted on the cellular phone terminal and sensor elements disposed side by side along the periphery of the sub display unit ELD for simplicity of description; (b) is a diagram showing the sensor elements which are detected over time; and (c) is a diagram showing the positional change of an operation target region of the sub display unit ELD corresponding to detected sensor elements. In (a) of these drawings, the same reference characters as in FIG. 2(*b*) are assigned to the sensor elements, the sensor element groups and the separators. Furthermore, in the display of the sub display unit ELD shown in (c), TI denotes a title of an item list displayed by the sub display unit and LS1 to LS4 denote selection candidate items (for example, several scrollable lines). Moreover, in the sub display unit shown in (c), an item standing by to become an operation target is highlighted by placing a cursor thereon or inversely displaying the item itself so that the item can be identified as the current operation target region. In these drawings, the items being displayed as operation target regions are depicted highlighted by applying hatchings thereon. While a "moving target" is explained using only an operation target region for convenience of description, when the item itself is moved (scrolled), the sub display unit operates under the similar principle.

When the respective sensor elements are continuously traced downward using, for example, contact means such as a finger along the arrow AR1 in FIG. 6(a), the control unit 110 detects the contact as operations involving movement over time shown in FIG. 6(b). In this case, operations are detected for the sensor elements R1, R2, R3 and R4, in this order. Since the continuous contact from R1 to R4 is detected by two or more adjacent sensor elements, a direction is detected. In accordance with the number of transitions between adjacent sensor elements and directions thereof, the operation target region moves over the list displayed on the sub display unit ELD. In this case, as shown in FIG. 6(c), the operation target region moves downward by three items from the item LS1 at the initial position to the item LS4. While the operation target region is illustrated using hatchings, the item shaded by narrow-pitched hatchings is the initial position whereas the item shaded with wide-pitched hatchings is the position after movement. As shown, according to the present configuration, since an "operation target region of the sub display unit moves downward" in the same manner as "a downward indication operation by a finger" of the user, the user will feel as if the operation target region is freely moved by his/her own finger. In other words, an operating feeling that is exactly as intended by the user can be obtained.

Similarly, when the sensor elements are traced in the direction indicated by the arrow AR2 in FIG. 6(a), the sensor elements L4, L3, L2 and L1 among the respective elements detect contact as operations involving movement in this order as shown in FIG. 6(b). The contact in this case is a downward transition over three adjacent sensor elements in a manner similar to the arrow AR1. Accordingly, as shown in FIG. 6(c), the operation target region moves downward by three items from the item LS1 to the item LS4.

When the sensor elements are traced upward (counterclockwise) as indicated by the arrow AR1 in FIG. 7 (a), the sensor elements R4, R3, R2 and R1 among the respective sensor elements detect a contact as operations involving movement in this order as shown in FIG. 7(b). The contact in this case is an upward transition over three adjacent sensor elements. Accordingly, as shown in FIG. 7(c), the operation target region moves upward by three items from the item LS4 to the item LS1.

In a similar manner, when the sensor elements are traced upward (clockwise) as indicated by the arrow AR2 in FIG. 7(a), the sensor elements L1, L2, L3 and L4 among the respective sensor elements detect a contact as operations involving movement in this order as shown in FIG. 7(b). The contact in this case is an upward transition over three adjacent sensor elements in a manner similar to the arrow AR1. Accordingly, as shown in FIG. 7(c), the operation target region moves upward by three items from the item LS4 to the item LS1.

Figure 8:
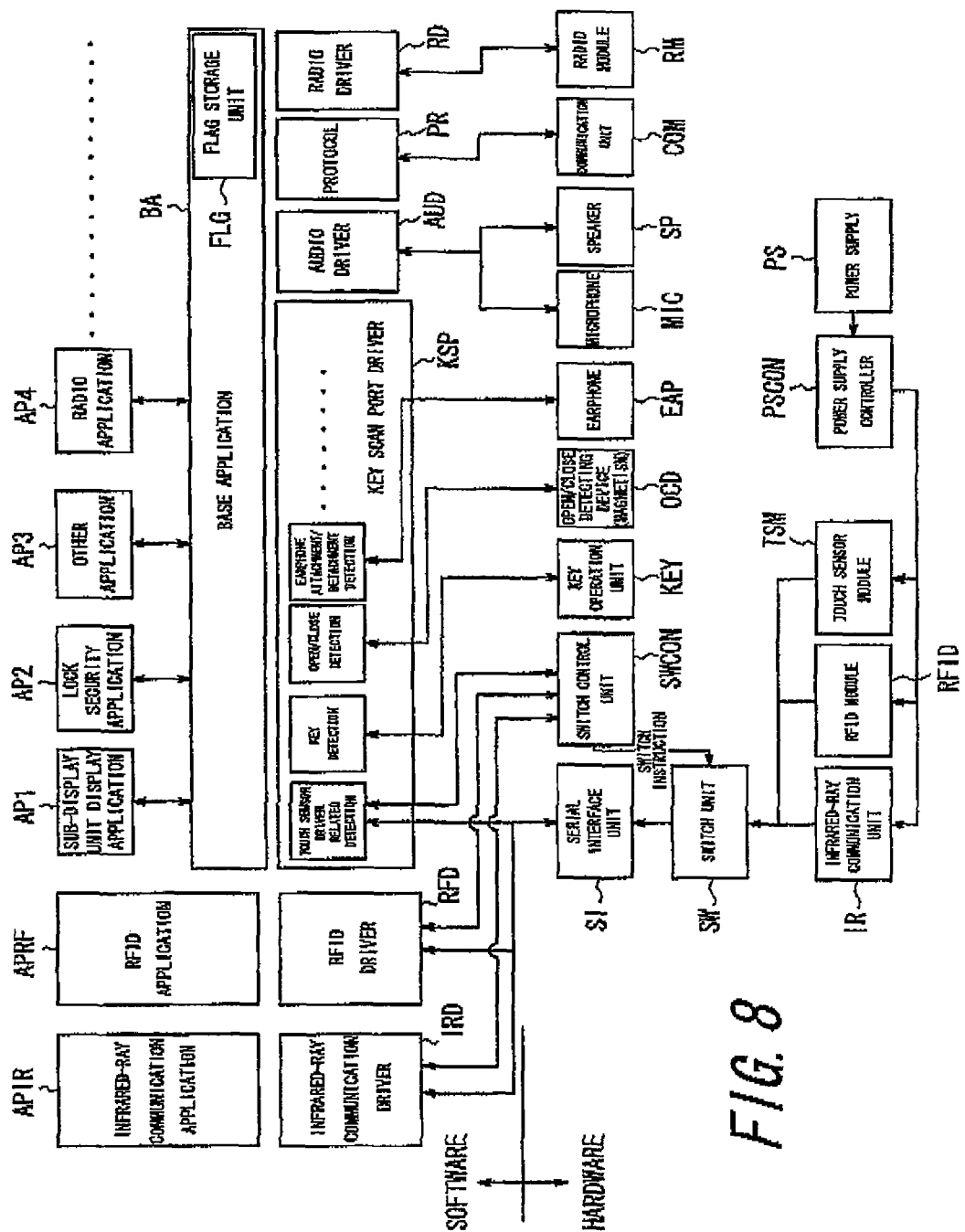
FIG. 8 is a detailed functional block diagram showing a layout of components of a cellular phone terminal to which the present invention has been applied.

FIG. 8 is a detailed functional block diagram of the cellular phone terminal 100 to which the present invention is applied. Needless to say, various kinds of software shown in FIG. 8 run by being executed by the control unit 110 after a work region is provided on the storage unit 140 based on a program stored in the same. As shown, the various functions of the cellular phone terminal are divided into a software block and a hardware block. The software block is constituted by: a base application BA having a flag storage unit FLG; a sub display unit display application AP1 (for monitoring key input interrupts); a lock security application AP2; other applications AP3; and a radio application AP4. The software block further includes an infrared-ray communication application APIR and an RFID application APRF. When the various applications (application software) control various hardware constituting the hardware block, an infrared-ray communication driver IRD, an RFID driver RFD, an audio driver AUD, a radio driver RD, and a protocol PR are used as drivers. For example, the audio driver AUD, the radio driver RD and the protocol PR respectively control the microphone MIC, the speaker SP, the communication unit COM, and the radio module RM. The software block further includes a key scan port driver KSP that monitors and detects an operational state of the hardware and which performs detection related to the touch sensor driver, key detection, open/close detection which detects whether the cellular phone terminal of a folding type, a slide type or the like is opened or closed, earphone attachment/detachment detection, and the like.

The hardware block is constituted by: the key operating unit KEY having a dial key, various buttons including tact switches SW1 and SW2, and the like; an open/close detecting device OCD which detects an open/close status based on an operational state of a hinge portion or the like; the microphone MIC provided with the apparatus main body; a detachable and attachable earphone EAP; the speaker SP; the communication unit COM; the radio module RM; the serial interface unit SI; and a switch control unit SWCON. The switch control unit SWCON selects any one of the infrared-ray communication unit IR, the RFID module (radio recognition tag) RFID, and the touch sensor module TSM (as shown earlier, connected to sensor elements via a capacitor and which is a modularization of the oscillating unit, the detecting unit, and the like) in accordance with an instruction from a corresponding block in the software block, and switches the selection target hardware (IR, RFID, TSM) so that the serial interface unit SI picks up an corresponding signal. The power supply PS supplies power to the selection target hardware (IR, RFID, TSM) via the power supply controller PSCON. The contact unit includes: a sensor electrode itself; a part consisting of a sensor electrode and a dielectric body disposed on the same; and a part constituted by a sensor electrode and a dielectric body disposed at a position separated by a predetermined distance from the sensor electrode.

Figure 9:
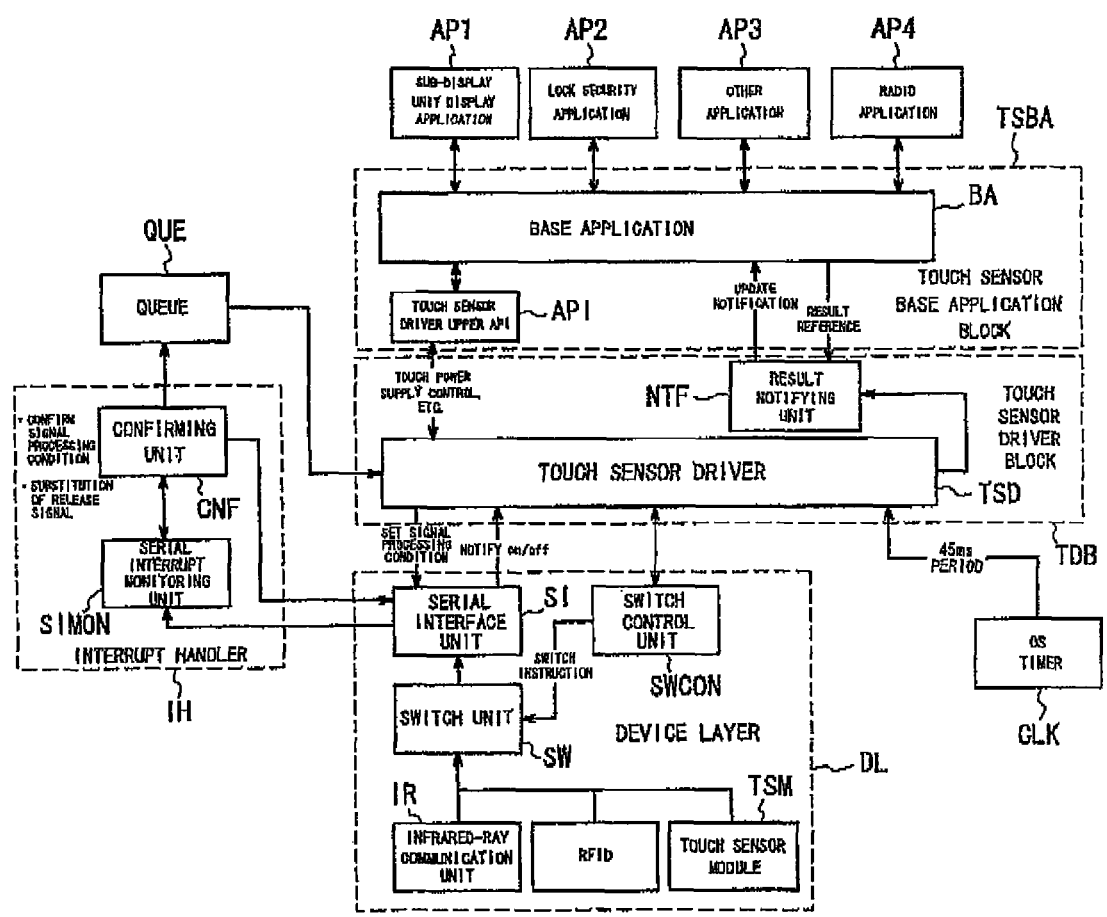
FIG. 9 is a block diagram showing a more detailed configuration of a touch sensor function of a cellular phone terminal according to the present invention.

FIG. 9 is a block diagram showing a more detailed configuration of the touch sensor function of the cellular phone terminal 100 according to the present invention. As shown, the cellular phone terminal 100 includes: a touch sensor driver block TDB; a touch sensor base application block TSBA; a device layer DL; an interrupt handler IH; a queue QUE; an OS timer CLK; and various applications AP1 to AP3. In this case, the touch sensor base application block TSBA includes a base application BA and a touch sensor driver upper application program interface API, while the touch sensor driver block TDB includes a touch sensor driver TSD and a result notifying unit NTF. Furthermore, the device layer DL includes: a switch control unit SWCON; a switching unit SW; the serial interface unit SI; the infrared-ray communication unit IR; the RFID module RFID; and a touch sensor module TSM, while the interrupt handler IH includes a serial interrupt monitoring unit SIMON and a confirming unit CNF.

Next, the functions of the respective blocks will be described with reference to the drawings. In the touch sensor base application block TSBA, information regarding whether or not to activate the touch sensor is exchanged between the base application BA and the touch sensor driver upper application program interface API. The base application BA is the application that is to function as the base of the sub display unit display application AP1 that is the application for the sub display unit, the lock security application AP2 that is the application for locking the cellular phone terminal 100 for security protection, and the other applications AP3, and requests the touch sensor driver upper application program interface API to activate the touch sensor when the base application BA is requested to activate the touch sensor from each of the aforementioned applications. The sub display unit is the sub display unit ELD shown in the respective drawings, and refers to the display unit provided in the central region of the sensor element groups disposed in a ring pattern in the cellular phone terminal 100 according to the present embodiment.

Upon receiving the activation request, the touch sensor driver upper application program interface API confirms with a block (not shown) which manages start-up of applications in the base application BA on whether or not activation of the touch sensor is possible. In other words, the touch sensor driver upper application program interface API confirms lighting of the sub display unit ELD indicating that application selection is being executed as well as the presence or absence of a flag which indicates a start-up of an application for which an activation of the touch sensor has been set in advance to be impossible, such as applications provided with the cellular phone terminal 100. When an activation of the touch sensor is determined to be possible as a result, the touch sensor driver upper application program interface API requests the touch sensor driver TSD to activate the touch sensor module TSM. In other words, the touch sensor driver upper application program interface API practically starts supplying power to the oscillation circuit of the touch sensor module TSM from the power supply PS via the power supply controller PSCON.

When activation is requested, the touch sensor driver TSD issues a request to the serial interface unit SI in the device layer DL and performs control so as to open a port with the touch sensor driver TSD in the serial interface unit SI.

Subsequently, the touch sensor driver TSD performs control so that a signal including information on the sensing result of the touch sensor (hereinafter, referred to as a contact signal) is outputted to the serial interface unit SI at a 20 ms cycle according to an internal clock provided in the touch sensor module TSM.

The contact signal is outputted as an 8-bit signal corresponding to each of the eight sensor elements, namely, the aforementioned respective sensor elements L1 to L4 and R1 to R4. In other words, when the respective sensor elements detect a contact, a contact signal is formed by a string of bits corresponding to the sensor elements having detected the contact by raising a "flag: 1" indicating contact detection for each of such bits. In other words, the contact signal includes information indicating "which sensor element" is "in contact/not in contact".

The serial interrupt monitoring unit SIMON in the interrupt handler IH extracts the contact signal outputted to the serial interface unit SI. At this point, the confirming unit CNF confirms whether the extracted contact signal is True/False in accordance with a condition set in advance in the serial interface unit SI, and inputs only a True signal into the queue QUE (the classification of whether a signal is True/False will be described later). In addition, the serial interrupt monitoring unit SIMON monitors other interrupt events of the serial interface unit SI during the activation of the touch sensor, such as when a tact switch is pressed down.

When the detected contact is a first contact, the monitoring unit SIMON inputs a signal signifying "press" into the queue QUE before the contact signal (queuing). Subsequently, the monitoring unit SIMON updates the contact signal at a 40 ms cycle according to an OS timer CLK provided in the operation system, and inputs a signal signifying "release" into the queue QUE when a predetermined number of contacts is not detected. Consequently, a movement of contact detections among the sensor elements from the start of the contact to the release thereof can now be monitored. In this case, a "first contact" refers either to a state without data in the queue QUE or to an event in which a signal including "flag:1" occurs when the most recently inputted data is "release". Due to such processing, the touch sensor driver TSD can learn the detection state of the sensor elements in a section from "press" to "release".

At the same time, when the contact signal outputted from the touch sensor is a signal satisfying False conditions, the monitoring unit SIMON pseudo-generates a signal signifying "release" and inputs the same into the queue QUE. In this case, set conditions to be False include: "when contact is detected in two discontinuous sensor elements"; "when an interrupt occurs during activation of the touch sensor (for example, when a lighting status of the sub display unit ELD is changed due to a notification of an incoming mail or the like)"; "when a key is pressed down during activation of the touch sensor"; and, as will be described later, "when a contact across a plurality of sensor element groups is detected", or the like.

Furthermore, when the monitoring unit SIMON detects contact simultaneously in two adjacent sensor elements such as the sensor elements R2 and R3, the monitoring unit SIMON inputs a contact signal in which flags are raised for bits corresponding to the elements having detected the contact into the queue QUE as was the case of detection by a single element.

The touch sensor driver TSD reads the contact signal from the queue QUE at a 45 ms cycle, and judges the elements having detected the contact based on the read contact signal. The touch sensor driver TSD takes into consideration a variation in the contact determined by the contact signals sequentially read from the queue QUE and a positional relationship with the detecting elements, and judges "the element at which the contact had been initiated", "detection of the moving direction (clockwise/counterclockwise) of the contact", and "moving distance from press to release". The touch sensor driver TSD writes the judgment result into the result notifying unit NTF, and notifies the base application BA to update the result.

While the moving direction and moving distance of the contact are judged by a combination of the detection of adjacent sensor elements and the detection of each of the sensor elements, various methods (judgment rules) can be applied thereto. For example, when a contact transitions from a certain sensor element (for example, R2) to an adjacent sensor element (in the case of this example, R2 and R3), the contact is judged to be a movement of one element's worth (one element's worth in the sub display unit) in this direction.

As described above, when the base application BA is notified of a result update by the touch sensor driver TSD, the base application BA confirms with the result notifying unit NTF, and notifies an application which is a higher-level application and which requires the touch sensor result (the display unit display application AP1 for menu screen display on the sub display unit, the lock security application AP2 for lock control, and the like) of the content of the information notified to the result notifying unit NTF.

First Embodiment

Next, a description will be given on a confirmation operation on whether or not the touch sensor is to be activated performed by the touch sensor driver upper application program interface API, which is a first embodiment of the present invention. As described above, when a touch sensor is disposed in a communication apparatus configured so as to include an antenna that transmits or receives a signal, in the event that the frequency of an oscillation signal outputted by the oscillating unit and the frequency of a signal transmitted or received by the antenna are similar in value, the oscillation signal outputted by the oscillating unit may become inadvertently incorporated as noise into the signal transmitted or received by the antenna. The present invention is arranged so that when the base application BA requests the touch sensor driver upper application program interface API to activate the touch sensor, the touch sensor driver upper application program interface API checks the presence/absence of flags indicating start-up of applications for which an activation of the sensor unit 120 has been set in advance to be impossible with a block that manages application start-up in the base application BA. Then, in a state where the control unit 110 is controlling the power supply controller PSCON and the power supply PS is supplying power to the oscillating unit of the sensor unit 120 or, in other words, when there is a concurrence of a state where the oscillating unit is outputting an oscillation signal and a state where the communication unit COM is processing a transmitted or received signal, at least either the sensor unit 120 and the communication unit COM is controlled so as to prevent the oscillation signal outputted by the oscillating unit from being incorporated as noise into the signal transmitted or received by the antenna.

For example, when the control unit 110 controls the power supply controller PSCON and the communication unit COM processes a signal, the control unit 110 suppresses the supply of power from the power supply PS to the oscillating unit, and when the communication unit COM concludes operation control of the function involving the transmission or reception of a signal, the control unit 110 supplies power from the power supply PS to the oscillating unit without suppressing the same.

In addition, in the event that power is supplied from the power supply PS to the oscillating unit under the control of the power supply controller PSCON when the communication unit COM is performing signal processing such as operation control of the function involving the transmission or reception of a signal, the control unit 110 may be arranged to conclude or suspend the functional operation involving the transmission or reception of a signal. Furthermore, when the control unit 110 controls the power supply controller PSCON and the power supply PS supplies power to the oscillating unit, the communication unit COM may be arranged not to perform or to suppress processing of a signal transmitted by or received by the antenna.

Moreover, while the communication unit COM is performing signal processing by controlling operations of the function involving the transmission or reception of a signal, operation control may be arranged not to be performed on functions such as a music player that is activated based on operations detected by the sensor unit 120 or such functions may be arranged to be limited (for example, lowering volume).

In addition, while the power supply controller PSCON is supplying power from the power supply PS to the oscillating unit, operation control may be arranged to be performed on a predetermined function such as a music player based on an operation detected by at least either the sensor unit 120 or a tact switch, and while the power supply controller PSCON is regulating the supplying of power from the power supply PS to the oscillating unit, operation control may be arranged to be performed on a predetermined function such as a music player based on an operation detected by a tact switch not provided with an oscillating unit.

Furthermore, a configuration is also possible which includes a transmission/reception level detecting unit that detects a transmission/reception level of electromagnetic waves transmitted or received by an antenna, whereby the power supply controller PSCON regulates the supplying of power from the power supply PS to the oscillating unit when the transmission/reception level detected by the transmission/reception level detecting unit is equal to or greater than a predetermined transmission/reception level and supplies power from the power supply PS to the oscillating unit when lower than the predetermined transmission/reception level. In such a configuration, while an oscillation signal outputted from the oscillating unit of the sensor unit 120 will still be incorporated as noise into an electric signal based on the electromagnetic wave transmitted or received by the antenna, when the transmission/reception level of the electromagnetic wave transmitted or received by the antenna is lower than a predetermined level such as when being outside of the service region, the antenna is not required to transmit or receive the electromagnetic wave to begin with. In other words, there is no need to regulate the supply of power from the power supply PS to the oscillating unit. As a result, it is now possible to prevent the supply of power to the oscillating unit from being inadvertently regulated, and since the sensor unit 120 is activated normally, a decline in operability can also be suppressed.

Moreover, while the first embodiment described above is configured so that when there is a concurrence of a state where power is being supplied to the oscillating unit and a state where the communication unit COM is processing a signal by performing operation control of a transmission or reception of an electromagnetic wave, the control unit 110 utilizes at least either the sensor unit 120 or the communication unit COM so as to prevent noise from being incorporated into a signal based on a transmission or reception of an electromagnetic wave, even in the case of a radio-equipped mobile telephone terminal, since using a touch sensor when the radio is being operated causes an oscillation output from an oscillating unit to be incorporated into the radio as noise and lowers the audio quality of the radio, the control unit 110 may be arranged to control at least either the sensor unit 120 or a radio module RM (a signal processing unit) such as an FM radio when there is a concurrence of a state where power is being supplied to the oscillating unit and a state where the radio module RM is processing a signal by performing operation control of a reception of an electromagnetic wave.

As shown, the present invention is capable of preventing noise from being incorporated into an electric signal based on an electromagnetic wave transmitted or received by an antenna. In addition, since power is only supplied to the oscillating unit of the sensor unit 120 when the sensor unit 120 is operable, wasteful current consumption can be prevented.

While the present invention has been heretofore described based on the drawings and on the first embodiment, it should be noted that the present invention is not limited thereto.

For example, the functions or the like included in the respective members, the respective means, the respective steps, and the like are rearrangeable insofar as no logical inconsistencies arise therefrom, and a plurality of means, steps and the like can be integrated or divided. For instance, while the present embodiment has been described with a layout in which sensor elements are provided in a toric pattern, sensor element groups arranged in C-shapes may be disposed opposing each other across the display unit. In addition, while the present embodiment has been described with sensor element groups positioned left and right, a configuration may include two groups positioned above and below. Furthermore, while the present embodiment has been described using a cellular phone terminal as an example, the present invention can be widely applied to a portable electronic apparatus such as a portable radio terminal other than a telephone, a PDA (personal digital assistance), a portable game machine, a portable audio player, a portable video player, a portable electronic dictionary, and a portable electronic book viewer. Moreover, while there are touch sensor types involving using indicating equipment other than a finger such as a dedicated pen, the principle of the present invention can also be applied to a portable electronic apparatus mounted with such a touch sensor.

In addition, the present invention may be arranged so that an oscillation signal control unit that controls the amplitude or frequency of an outputted oscillation signal is provided in the oscillation unit of the sensor unit 120, wherein when processing of a signal transmitted or received by an antenna by the communication unit COM or a radio module RM and outputting of an oscillation signal by the oscillation unit of the sensor unit 120 are performed concurrently, the oscillation signal control unit lowers the amplitude of the oscillation signal or varies the frequency of the oscillation signal so as to deviate away from the frequency of the signal transmitted or received by the antenna. Consequently, the influence of the oscillation signal outputted from the oscillating unit on the signal transmitted or received by the antenna is reduced and, in turn, noise incorporated into the signal transmitted or received by the antenna is reduced.

Second Embodiment

Next, a description will be given on operations of a cellular phone terminal 100 in a case where a touch sensor is used during radio reception. In the case where a sensor unit 120 including an oscillating unit is provided in a communication apparatus such as the cellular phone terminal 100 which is configured so as to include an antenna that transmits or receives an electromagnetic wave or a radio antenna capable of receiving an electromagnetic wave containing a broadcast signal of a radio broadcast, when the frequency of an oscillation signal outputted by the oscillating unit is similar in value to the frequency of an electromagnetic wave transmitted or received by the antenna or the frequency of an electromagnetic wave received by a television antenna or the radio antenna, not shown, there is a risk that the oscillation signal outputted by the oscillating unit becomes incorporated into an electric signal based on the electromagnetic wave transmitted or received by the antenna. As a result, there is a problem in that noise also becomes incorporated into the audio of a radio broadcast outputted from a speaker SP such as voice audio outputted by a news broadcast or a relay broadcast and music audio outputted by a music program or the like, thereby making the radio broadcast indiscernible.

In consideration thereof, with the present invention, when an annunciation operation of a radio broadcast based on an electromagnetic wave received by a radio antenna is executed by a radio module RM, an activation of the sensor unit 120 is requested when the speaker SP (an annunciating unit) is performing audio output of the radio broadcast, and a power supply controller PSCON controls a power supply PS so as to supply power to an oscillating unit of a touch sensor module TSM, a control unit 110 controls the speaker SP so as to suppress audio output from the speaker SP. In this case, the control of suppressing audio output is assumed to include processing for reducing volume in addition to a so-called mute processing in which the audio output from the speaker SP is suspended.

Figure 10:
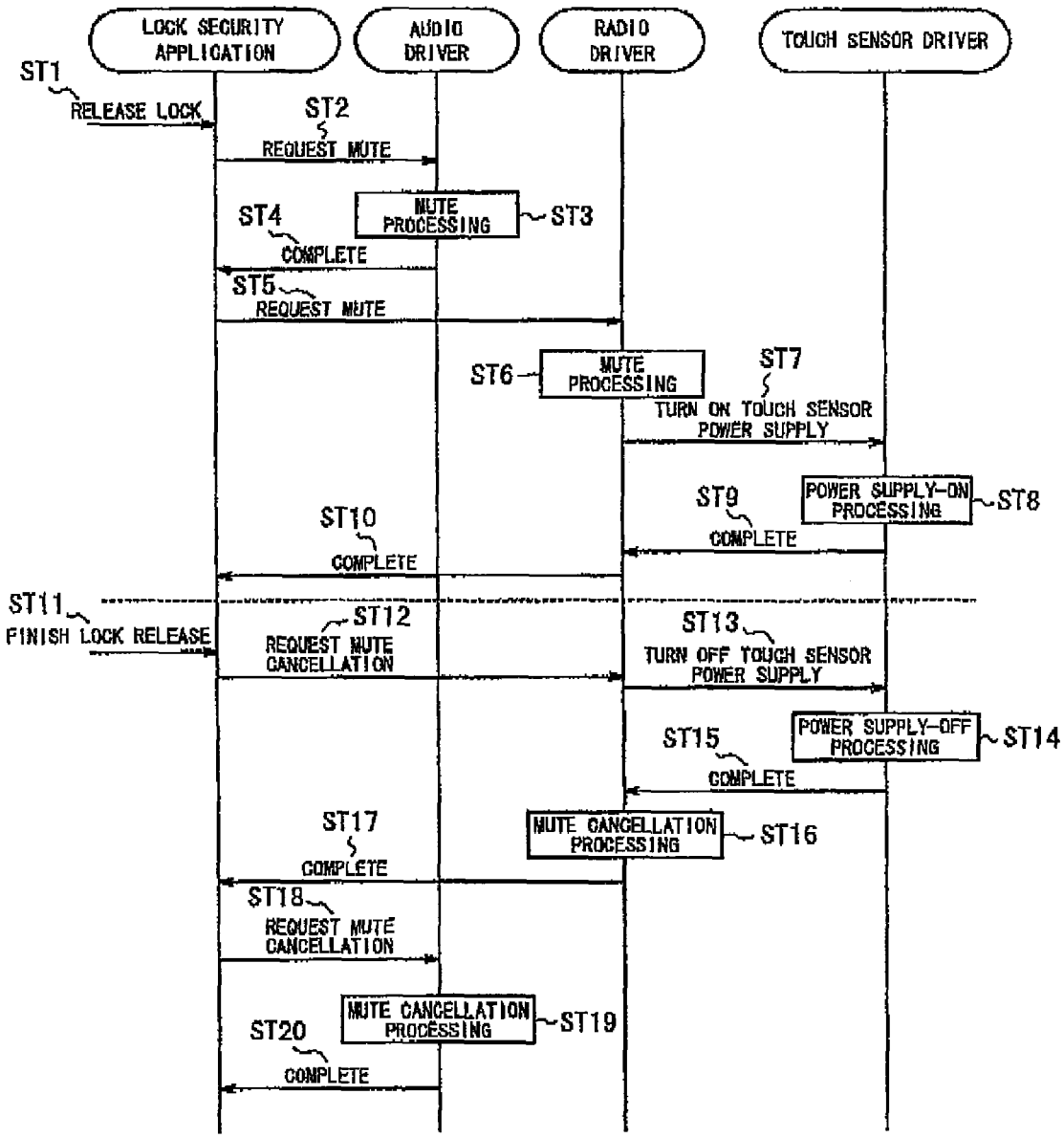
FIG. 10 is a diagram illustrating a flow of processing of a cellular phone terminal in the event that an activation of a touch sensor is requested during a radio broadcast.

An example of audio output suppression control of the speaker SP will now be described with reference to FIG. 10. FIG. 10 illustrates a flow of operations in the event that a lock security application AP2 starts up and an activation of the sensor unit 120 is requested in order to release a lock on the cellular phone terminal 100 for security protection when an annunciation operation of a radio broadcast based on an electromagnetic wave received by a radio antenna is executed by a radio module RM and the speaker SP is performing audio output of the radio broadcast.

When a user desires to release the lock for security protection on the cellular phone terminal 100 using the sensor unit 120 during an audio output of an annunciation operation of a radio broadcast from the speaker SP, the user operates a key operating unit KEY to start up the lock security application AP2 (step ST1). Under the control of the control unit 110, the started-up lock security application AP2 proceeds to step ST2 to issue an audio output suppression request to an audio driver AUD. The audio output suppression request at this point is assumed to be a request for mute processing which is a request for suspending audio output. However, the present invention is not limited thereto and, as described above, the request may be for processing for reducing volume instead of a mute processing request.

Upon receiving the mute request, the audio driver AUD proceeds to step ST3 to suspend audio output by the speaker SP, and subsequently proceeds to step ST4 to notify the lock security application AP2 that audio output suspension has been completed. In the event that the speaker SP is not performing audio output in step ST2 when the audio driver AUD receives an audio output suppression request from the lock security application AP2, the processing in step ST3 is not performed and the lock security application AP2 is notified that audio output is not being performed from the speaker SP. Then, without performing subsequent processing, the sensor unit 120 is activated and the operation of the lock security application AP2 is performed.

Upon receiving notification to the effect that audio output suspension has been completed in step ST4, the lock security application AP2 next proceeds to step ST5 to issue a request to a radio driver RD to perform mute processing. Upon receiving the mute request, the radio driver RD then proceeds to step ST6 to perform control so that a radio broadcast signal based on an electromagnetic wave received by the radio antenna is not transmitted by the speaker SP. Through the present control, the radio driver RD responds to the mute processing request issued in step ST5.

Having performed mute processing in step ST6 in this manner, the radio driver RD next proceeds to step ST7 to issue a power supply-on request to the touch sensor driver TSD. Upon receiving the power supply-on request, the touch sensor driver TSD proceeds to step ST8 to turn on the power supply. More specifically, the power supply controller PSCON performs control for supplying power from the power supply PS to the oscillating unit of the touch sensor module TSM. As shown, since the power supply-on processing of the touch sensor driver TSD is performed after performing mute processing of the audio driver in step ST3, even when an oscillation output from the oscillating unit is incorporated as noise into a broadcast signal included in an electromagnetic wave received by the radio antenna, a noise sound is not outputted from the speaker SP, thereby preventing the user from feeling discomfort. In addition, since mute processing is also performed on the radio driver RD in step ST6, user discomfort attributable to noise based on the incorporation of an oscillation output from the oscillating unit into the broadcast signal can be suppressed more reliably.

When the power supply of the touch sensor driver TSD is turned on in step ST8 as described, the touch sensor driver TSD next proceeds to step ST9 to notify the radio driver RD that the power supply of the touch sensor driver TSD has been turned on. Upon receiving the notification, the radio driver RD proceeds to step ST10 to notify the lock security application AP2 of the contents of the notification or, in other words, to notify that the power supply of the touch sensor driver TSD has been turned on.

When the lock security application AP2 is notified that the power supply of the touch sensor driver TSD has been turned on, the user is now able to release the lock for security protection on the cellular phone terminal 100 by an operation of the sensor unit 120 (ST11). When the user releases the lock by an operation of the sensor unit 120, the lock security application AP2 next proceeds to step ST12 to request the radio driver RD to disable the mute processing performed in step ST6.

Upon receiving the request, instead of immediately disabling the mute processing at this time, the radio driver RD first proceeds to step ST13 to request the touch sensor driver STD to turn off the power supply that had been turned on in step ST8. This is because since the touch sensor driver TSD remains in an on-state even if mute processing is disabled at this stage, the problem in that an oscillation signal outputted from the oscillating unit of the touch sensor module TSM is incorporated as noise into a radio broadcast signal based on an electromagnetic wave received by the antenna remains unsolved.

Upon receiving the power supply-off request, the touch sensor driver TSD proceeds to step ST14 to turn off the power supply. More specifically, the power supply of the touch sensor driver TSD is turned off by the power supply controller PSCON by disabling control for supplying power from the power supply PS to the oscillating unit of the touch sensor module TSM.

When the touch sensor driver TSD completes the power supply-off processing in this manner, the touch sensor driver TSD proceeds to step ST15 to notify the radio driver RD that the power supply-off processing has been completed. Upon receiving the request, the radio driver RD proceeds to step ST16 to terminate mute processing performed in step ST6. More specifically, the radio driver RD causes the speaker SP to transmit a radio broadcast signal based on an electromagnetic wave received by the radio antenna.

Subsequently, the radio driver RD proceeds to step ST17 to notify the lock security application AP2 that the mute processing has been terminated. Having received the notification, the lock security application AP2 proceeds to step ST18 to issue a request to the audio driver AUD to terminate the mute processing of step ST3. Upon receiving the request, the audio driver AUD proceeds to step ST19 to terminate the mute processing and change the speaker SP to an audio outputtable-state. In this case, since the broadcast signal received by the radio antenna has been transmitted to the speaker SP in step ST16, the speaker SP is to perform audio output of a broadcast based on the broadcast signal upon entering the audio outputtable state. In this case, the speaker SP may be configured so as to perform audio output of the broadcast by, for example, gradually increasing volume from a predetermined small volume in order to prevent the audio output of the broadcast based on the broadcast signal from being abruptly performed at a large volume.

After the mute processing is terminated and the speaker SP enters an audio outputtable state, the audio driver AUD proceeds to step ST20 to notify that the mute processing by the audio driver AUD has been terminated, thereby concluding the series of lock security application AP2.

As shown, the second embodiment is configured so that when an activation of the sensor unit 120 is requested during an annunciation operation of a radio broadcast by the radio module RM, audio output from the speaker SP is suppressed and power is then supplied to the oscillating unit of the touch sensor module TSM. Therefore, even if an oscillation signal outputted from the oscillating unit is incorporated as noise into a broadcast signal included in a signal received by the antenna, the noise is not outputted from the speaker SP and the user is not discomforted by the noise. In addition, since the second embodiment is configured so that the radio driver RD is subjected to mute processing together with the speaker SP, user discomfort with respect to noise can be suppressed more reliably.

Furthermore, since the suppression of audio output from the speaker SP is terminated and the speaker SP enters an audio outputtable state under the control of the control unit 110 when the power supply controller PSCON completes control for supplying power from the power supply PS to the oscillation circuit, the speaker SP can perform audio output in a preferable manner when there is no risk of an oscillation signal outputted from the oscillating unit being incorporated as noise into a broadcast signal included in an electromagnetic wave received by the radio antenna. Moreover, the configuration described above relieves the user from the need to further perform an operation for causing the speaker SP to enter an audio outputtable state or to start up an application that causes the speaker SP to enter an audio outputtable state.

In addition, since the second embodiment reduces user discomfort due to the incorporation of an oscillation output from the oscillating unit as noise into a broadcast signal included in an electromagnetic wave received by the radio antenna by controlling the speaker SP while maintaining a started-up state of the lock security application AP2 (without shutting down), control for shutting down or starting up the lock security application AP2 becomes unnecessary, thereby simplifying control.

While the present invention has been heretofore described based on the drawings and on the second embodiment, it should be noted that the present invention is not limited thereto.

For example, while the second embodiment is configured so that when an annunciation operation of a radio broadcast based on an electromagnetic wave received by a radio antenna is executed by the radio module RM and an activation of a touch sensor provided with an oscillating unit is requested during an audio output of the radio broadcast by the speaker SP, user discomfort due to the incorporation of an oscillation output from the oscillating unit as noise into a broadcast signal included in the electromagnetic wave received by the radio antenna is reduced by controlling the speaker SP to suppress the audio output from the speaker SP, the present invention is not limited thereto and can also be applied to a receiving apparatus provided with a sensor unit 120 including an oscillating unit and a television antenna, not shown, whereby the receiving apparatus is capable of performing an annunciation operation based on an electromagnetic wave received by the television antenna using an image via a display unit (for example, a sub display unit ELD) (an annunciating unit).

More specifically, in the case where an activation of the sensor unit 120 is requested when an annunciation operation of a television broadcast based on an electromagnetic wave received by the television antenna is being displayed as an image via the display unit and the power controller PSCON controls the power supply PS to supply power to the oscillating unit of the sensor unit 120, the control unit 110 should be arranged to perform control so as to suppress image display on the display unit such as changing the display unit to a non-display state or darkening the display on the display unit. Accordingly, even if an oscillation output from the oscillating unit is incorporated as noise into a broadcast signal included in an electromagnetic wave received by the television antenna, the noise is not display-outputted by the display unit or the noise is reduced, thereby reducing user discomfort.

Furthermore, while a cellular phone terminal according to the second embodiment is configured so that when processing of a signal transmitted or received by an antenna and output of the oscillation signal by the oscillating unit of the operation detecting unit are performed concurrently, the control unit 110 directly controls the speaker SP or the display unit to prevent the user from feeling discomfort, the present invention is not limited thereto, and an annunciation by the speaker SP or the display unit can be controlled consequentially by erasing only signals related to the annunciation by the speaker SP or the display unit among the signals transmitted or received by the antenna or by replacing the signals related to the annunciation by the speaker SP or the display unit with a signal for limiting annunciation based on signals transmitted or received by the antenna. Since such configurations also suppress the annunciation of noise from the speaker SP or the display unit, user discomfort can be reduced.

CROSS REFERENCE TO RELATED APPLICATIONS

The present application is based upon and claims the benefit of priority from Japanese Patent Application No. 2006-229583 (filed on Aug. 25, 2006) and Japanese Patent Application No. 2006-273388 (filed on Oct. 4, 2006), the entire contents of which are incorporated herein by reference.

The invention claimed is:

1. A communication apparatus, comprising:
   an antenna;
   a signal processing unit that processes a signal transmitted or received by the antenna;
   an operation detecting unit having an operating unit, an oscillating unit that outputs an oscillation signal, and a detecting unit that detects an oscillation signal outputted from the oscillating unit, and which detects an operation on the operating unit based on detection results of the detecting unit which vary in association with the operation; and
   a control unit that controls at least either the signal processing unit or the operation detecting unit when processing of the signal by the signal processing unit and output of the oscillation signal by the oscillating unit of the operation detecting unit are performed concurrently.

2. The communication apparatus according to claim 1, characterized in that the control unit reduces an amplitude of the oscillation signal outputted by the oscillating unit of the operation detecting unit when processing of the signal by the signal processing unit and output of the oscillation signal by the oscillating unit of the operation detecting unit are performed concurrently.

3. The communication apparatus according to claim 1, characterized in that the control unit varies a frequency of the oscillation signal outputted by the oscillating unit of the operation detecting unit when processing of the signal by the signal processing unit and output of the oscillation signal by the oscillating unit of the operation detecting unit are performed concurrently.

4. The communication apparatus according to claim 1, characterized in that the control unit suppresses a supply of power to the oscillating unit of the operation detecting unit when processing of the signal by the signal processing unit and output of the oscillation signal by the oscillating unit of the operation detecting unit are performed concurrently.

5. The communication apparatus according to claim 1, characterized in that the control unit suppresses processing of the signal by the signal processing unit when processing of the signal by the signal processing unit and output of the oscillation signal by the oscillating unit of the operation detecting unit are performed concurrently.

6. The communication apparatus according to claim 1, characterized by further comprising:
   a second operation detecting unit that is not provided with the oscillating unit and which detects an operation; and
   a function executing unit that executes predetermined functions, characterized in that
   when processing of the signal by the signal processing unit and output of the oscillation signal by the oscillating unit of the operation detecting unit are performed concurrently, the control unit performs any of reducing an amplitude of the oscillation signal outputted by the oscillating unit of the operation detecting unit, varying a frequency of the oscillation signal outputted by the oscillating unit of the operation detecting unit, suppressing a supply of power to the oscillating unit of the operation detecting unit, and combinatorial control thereof, and at the same time controls execution of the predetermined functions by the function executing unit based on an operation detected by the second operation detecting unit, while when processing of the signal by the signal processing unit and output of the oscillation signal by the oscillating unit of the operation detecting unit are not performed concurrently, the control unit controls execution of the predetermined functions by the function executing unit based on the operation detected by the operation detecting unit.

7. The communication apparatus according to claim 1, characterized by further comprising:
   an annunciating unit that performs a predetermined annunciation based on the signal processed by the signal processing unit, characterized in that
   when processing of the signal by the signal processing unit and output of the oscillation signal by the oscillating unit of the operation detecting unit are performed concurrently, the control unit suppresses processing by the signal processing unit of a signal associated with an annunciation by the annunciating unit which is a signal transmitted or received by the antenna.

8. The communication apparatus according to claim 7, characterized in that when processing of the signal by the signal processing unit and output of the oscillation signal by the oscillating unit of the operation detecting unit are performed concurrently, the control unit suppresses processing by the signal processing unit of a signal associated with an audio-based annunciation by the annunciating unit which is a signal transmitted or received by the antenna.

9. The communication apparatus according to claim 7, characterized in that when processing of the signal by the signal processing unit and output of the oscillation signal by the oscillating unit of the operation detecting unit are performed concurrently, the control unit suppresses processing by the signal processing unit of a signal associated with an image-based annunciation by the annunciating unit which is a signal transmitted or received by the antenna.

10. A communication apparatus, comprising:
an antenna;
a signal processing unit that processes a signal transmitted or received by the antenna;
an annunciating unit that performs a predetermined annunciation based on the signal processed by the signal processing unit;
an operation detecting unit having an operating unit, an oscillating unit that outputs an oscillation signal, and a detecting unit that detects an oscillation signal outputted from the oscillating unit, and which detects an operation on the operating unit based on variations in the oscillation signal of the oscillating unit detected by the detecting unit and which are associated with the operation; and
a control unit that suppresses the annunciation by the annunciating unit when processing of the signal by the signal processing unit and output of the oscillation signal by the oscillating unit of the operation detecting unit are performed concurrently.

11. A communication apparatus, comprising:
an antenna;
a transmission/reception level detecting unit that detects a transmission/reception level of a signal transmitted or received by the antenna;
a signal processing unit that processes a signal transmitted or received by the antenna;
an operation detecting unit having an operating unit, an oscillating unit that outputs an oscillation signal, and a detecting unit that detects an oscillation signal outputted from the oscillating unit, and which detects an operation on the operating unit based on variations in the oscillation signal of the oscillating unit detected by the detecting unit and which are associated with the operation; and
a control unit which, when processing of the signal by the signal processing unit and output of the oscillation signal by the oscillating unit of the operation detecting unit are performed concurrently and the transmission/reception level of the signal detected by the transmission/reception level detecting unit is equal to or greater than a predetermined level, performs any of reducing an amplitude of the oscillation signal outputted by the oscillating unit of the operation detecting unit, varying a frequency of the oscillation signal outputted by the oscillating unit of the operation detecting unit, suppressing a supply of power to the oscillating unit of the operation detecting unit, and combinatorial control thereof, while when processing of the signal by the signal processing unit and output of the oscillation signal by the oscillating unit of the operation detecting unit are performed concurrently and the transmission/reception level of the signal detected by the transmission/reception level detecting unit is lower than the predetermined level, suppresses the control of an oscillation output of the oscillating unit.

* * * * *